Feb. 18, 1969 G. C. WOLTERS 3,428,759
PUSH-PULL OSCILLATOR AND INDICATING MEANS FOR A STEREO MAGNETIC TAPE RECORDER
Filed Oct. 2, 1964
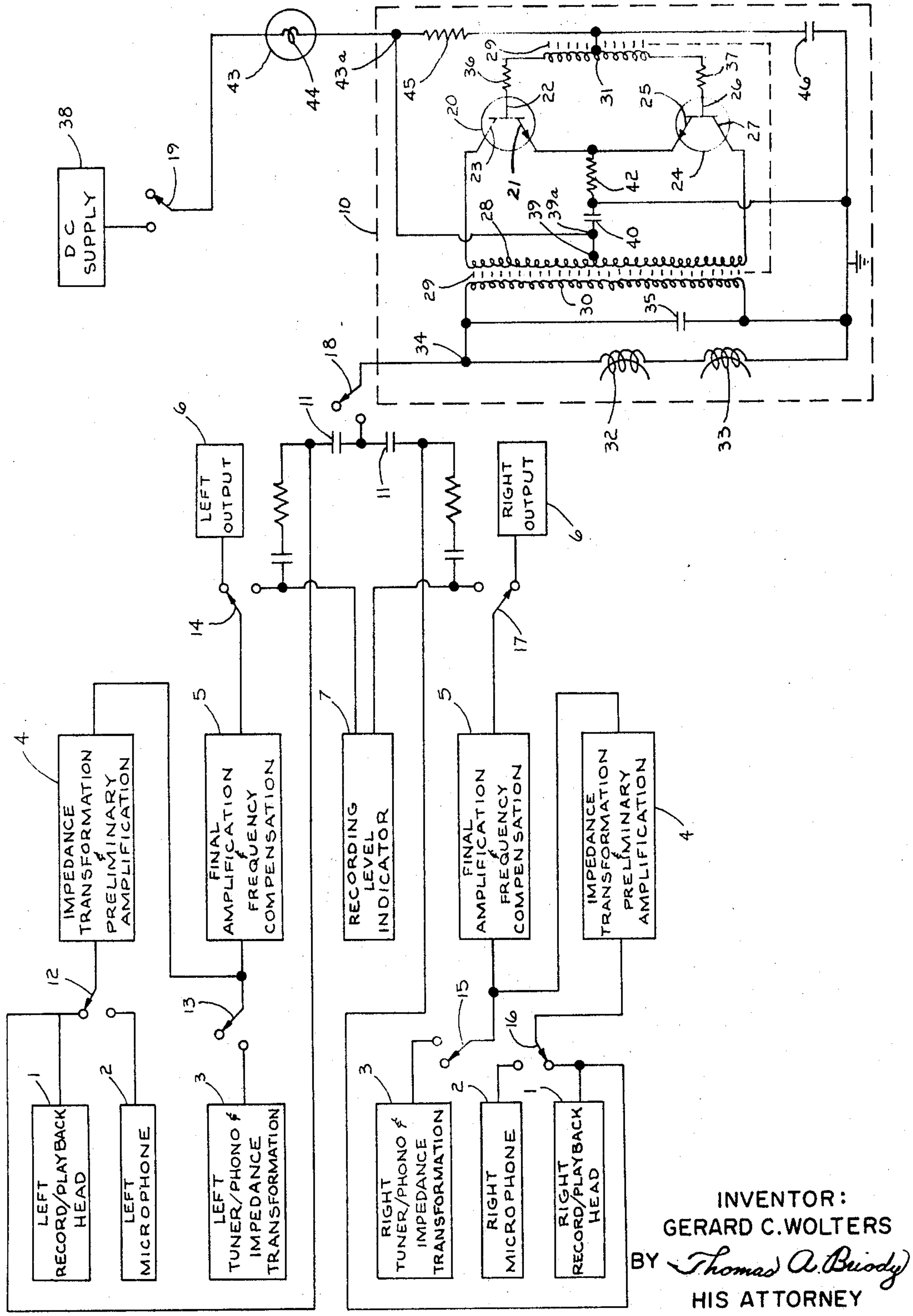
INVENTOR:
GERARD C. WOLTERS
BY Thomas A. Briody
HIS ATTORNEY United States Patent Office 3,428,759
Patented Feb. 18, 1969

3,428,759
PUSH-PULL OSCILLATOR AND INDICATING MEANS FOR A STEREO MAGNETIC TAPE RECORDER

Gerard C. Wolters, Decatur, Ill., assignor to General Electric Company, a corporation of New York Filed Oct. 2, 1964, Ser. No. 401,207
U.S. Cl. 179—100.2 1 Claim
Int. Cl. G11b 5/44

ABSTRACT OF THE DISCLOSURE

An improved transistorized oscillator for a stereo magnetic tape recorder, wherein an electric light bulb is placed in series with the oscillator circuit to provide (1) an indication of the oscillator condition and (2) protection against short-circuiting currents.

This invention relates generally to a transistorized stereo magnetic tape recorder, and, more particularly to such apparatus incorporating an improved oscillator circuit for providing erase current and an AC record bias for a dual channel mangetic tape recorder.

The alternating current supplied to the erase heads and biasing current for the recording heads of a magnetic tape recorder must have a very low distortion, or increased residual disturbances (i.e. noise) will remain on the tape. In prior art devices of the nature referred to these AC signals have been typically produced by the use of a standard oscillator circuit of some recognized type, such as a single transistor, common-emitter configuration. It has been found that such circuit arrangements as this are often characterized by undesirably high oscillator waveform distortion, thereby effecting a relatively high residual noise level for the tapes. This invention contemplates an improvement in magnetic tape recording characteristics by replacing conventional prior art oscillators with an improved two transistor push-pull oscillator having high calibre operating characteristics.

Another difficulty often encountered in magnetic tape recording is that an operator will unintentionally erase a tape without realizing that he is doing so. This invention reduces the possibility of such a hazard by placing an electric light bulb in series with the oscillator, so that when the oscillator is energized and producing a signal, the light bulb is energized and indicates the presence of the oscillator signal. Besides indicating to the operator that he is erasing the tape, the light bulb is also very helpful in serving to signal the failure of the oscillator or its components. This is also quite helpful to the operator, as it warns the operator that he is recording over what has previously been put on the tape without first erasing it, and without the presence of a record bias signal. Thus, the light serves as an immediate indicator that the tape is being erased, and, conversely, it indicates failure of the oscillator and the subsequent loss of the erase function and the record bias signal.

In addition to its indicating function, the light bulb also serves a third important purpose by aiding in the prevention of damage to circuit components by excessive current produced by short-circuiting of the oscillator.

Accordingly, it is an object of this invention to provide a more stable sinusoidal alternating current signal for use as a record bias and as a source of erase current.

Another object of this invention is to provide a simplified and improved means for indicating the functioning or nonfunctioning of an erase current producing oscillator.

Yet another object of this invention is to provide additional protection in case of excessive current in a stereo tape recorder oscillator.

Briefly, in one form thereof, this invention involves replacing the conventional oscillator in a stereo magnetic tape recorder with an improved transistor oscillator. The improved oscillator is of the solid state push-pull type, utilizing three windings placed on a core. Two transistors form the active components of the solid state push-pull oscillator, and the transistors are connected in a common emitter configuration. Connecting means are provided for applying the output signal of the push-pull oscillator to the erase heads and to the recording heads to provide a record bias. In addition to an improved transistorized oscillator, this invention also contemplates the inclusion of a means for indicating whether or not the oscillator is in an operating state. This means consists of an electric light bulb placed in series with the oscillator circuit. Besides providing an indication of the condition of the oscillator, this light bulb serves as an extra protection means in case of unusually large currents, such as might occur during short-circuiting of the oscillator.

Further aspects of my invention will become apparent hereinafter, and the specification concludes with the claim particularly pointing out and distinctly claiming the subject matter which I regard as my invention. The invention, as to organization and method of operation, together with further objects and advantages thereof, may best be understood by reference to the following description when taken in conjunction with the accompanying drawing.

Referring now to the drawing, the sole figure of the drawing is a circuit diagram of a magnetic tape recorder showing an improved oscillator, with the record/playback switches placed in the playback position, or mode.

In the only figure of the drawing it may be seen that the stereo tape recorder comprises two channels, each channel having a record/playback head 1, a microphone 2, and a tuner/phono source and impedance transformation circuit 3. These elements have been indicated in block form because they may be of any conventional type. Of course, with the solid state push-pull oscillator, the elements 1, 2 and 3 and the succeeding portions of the circuit will generally be transistorized, or appropriately adjusted for use in a transistorized circuit. A signal from either the record/playback head 1 or the microphone 2 is passed through an impedance transformation and preliminary amplification circuit 4. Again these elements may be of a conventional type, but for purposes of this invention, transistorized circuitry is preferable. In the playback mode, the output of the impedance transformation and preliminary amplification circuit 4 is passed through a final amplification and frequency compensation circuit 5. Circuit 5 prepares the signal for application to a power amplifier (not shown) and from such an amplifier to an associated speaker represented at output 6.

In the record mode, the signals from the microphone 2 and the tuner/phono circuit 3 are combined before being finally amplified and frequency compensated in circuit 5. Thus, the microphone signal is passed through the impedance transforming and preliminary amplification circuit 4 and then combined with the output of the tuner/phono and impedance transformation circuit 3 at the input of circuit 5. Instead of being taken from the output 6, the amplified signal from circuit 5 is now applied to a recording level indicator 7, which compares the signals from the two channels to indicate the stronger signal.

Besides being applied to the recording indicator 7, in the record mode, the signal from circuit 5 in each channel is also applied to its corresponding record/playback head 1 to be recorded on the magnetic tape. During recording of the audio signal, a recording bias is provided by oscillator circuit 10 through capacitor 11.

Operation of the circuit has been described for both the playback mode and the record mode. It should be noted that the obtaining of one mode or the other is controlled by record/playback switches 12–19. As shown in the drawing, the switches are in the playback mode. To obtain the record mode, it is only necessary to move the switches 12–19 from the positions indicated to the alternative positions. In this latter position the desired input may be recorded on the magnetic tape, while in the former position the signal recorded on the tape may be played back for the listener's enjoyment.

Oscillator circuit 10 comprises a transistor 20, having an emitter 21, a base 22 and a collector 23; and a transistor 24 having an emitter 25, a base 26, and a collector 27. Transistors 20 and 24 have their emitters 21 and 25 connected together, and collectors 23 and 27 are connected to either end of a winding 28. Winding 28 is located on a core 29, along with windings 30 and 31. Winding 30 is the output winding of the oscillator and has one side connected to switch 18 to provide an AC recording bias during the record mode of the tape recorder. The same side of winding 30 is connected to the erase heads 32 and 33 at terminal 34. A tuning capacitor 35 is connected across winding 30 in parallel with erase heads 32 and 33. Erase heads 32 and 33 are each associated with an individual one of the two channels to provide erasure of a signal which appears on the associated channel of the magnetic tape.

Winding 31 provides a feedback signal from the core to place transistors 20 and 24 in either an on state or an off state. This winding 31 is in series with resistors 36 and 37, which serve, in the illustrated circuit, to suppress spurious radio frequency oscillations. A DC source of supply 38 provides the energy for operation of the oscillator circuit 10. This supply 38 is connected to the midpoint 39 of winding 28 through a switch 19 and lamp 43. A bypassing capacitor 40 serves to allow a return path for AC currents from the center 39 of coil 28 to the emitter of transistors 20 and 24 through resistor 42. Connected between capacitor 40 (and ground) and emitters 21 and 25 of transistors 20 and 24 respectively, is a resistor 42. Current flows through resistor 42 upon conduction of either transistor 20 or transistor 24, so that resistor 42 serves to provide a feedback means for the illustrative transistors 20 and 24.

As previously mentioned, lamp 43 is connected between switch 19 of the D.C. supply 38 and the midpoint 39 of winding 28. More particularly, lamp 43 includes a filament 44, and is connected to midpoint 39 of winding 28 via points 43*a* and 39*a*. Lamp 43 serves to indicate whether the oscillator is in operation or not, and upon the occurrence of excessive current will tend to give an added measure of protection to the oscillator circuit.

In operation, a bias of predetermined value is provided for base 22 of transistor 20 and base 26 of transistor 24 from the D.C. supply 38. The magnitude of this bias is determined by resistor 45. Capacitor 46 serves as a bypass. At the same time, the D.C. supply 38 is providing a collector voltage for both transistors 20 and 24 through winding 28. Due to inherent circuit imbalance, one of the transistors will begin to conduct.

For purposes of illustration, assume that transistor 20 begins to conduct originally. As transistor 20 begins to conduct, the current path from the D.C. supply 38 is through lamp 43 to the midpoint 39 of winding 28, through the upper half of winding 28, to collector 23 of transistor 20 and through the transistor to emitter 21, and through resistor 42 to ground. During this period of conduction an output signal is induced in winding 30 and, similarly, a signal is induced in winding 31. The signal induced in winding 31 has a direction and a magnitude to effectively ensure forward biasing of transistor 20 and back biasing of transistor 24.

However, as the transistor 20 reaches saturation, the signal induced in winding 31 goes to zero. This removal of the induced voltage also causes a decrease, and finally complete stoppage, of the current flow through winding 28. The resultant flux change in core 29 induces a voltage of the opposite polarity in winding 31. This reversal of polarity of the signal in winding 31 then shuts off transistor 20 and turns on transistor 24. The conduction path now is through the light bulb 43, the lower half of winding 28, through transistor 24, and resistor 42. Again the cycle repeats itself and an oscillating signal is produced.

As was pointed out above, the lamp 43 is energized by an average D.C. current resulting from conduction of transistor 20 and transistor 24. This current causes the filament 44 of lamp 43, to heat and to produce an indicating light, which shows that the oscillator is in operating condition. Now if the recorder were put in the record position and the light did not indicate operation of the oscillator, a failure of the oscillator or its components would be realized. In addition, if a short circuit should occur in the oscillator circuit, the short circuit current would energize the lamp 43. Since filament 44 will be of the regular, fairly small diameter wire, such as tungsten, the excessive current will cause it to overheat and rupture, much like a fuse. Thus, the light serves not only to indicate whether the oscillator is in an operating condition or not, but also provides additional protection for the oscillator circuit in case of excessive overloads.

While in accordance with the patent statutes, I have described what at present is considered to be the preferred embodiment of my invention, it will be obvious to those skilled in the art that various changes and modifications may be made therein without departing from my invention, and I therefore aim in the following claim to cover all such equivalent variations as fall within the true spirit and scope of this invention.

What is claimed as new and desired to be secured by Letters Patent of the United States is:

1. In a stereo magnetic tape recording system having a first channel and a second channel, each of said channels including impedance transformation means, amplification means and frequency compensation means, a record-playback head having a record mode and a playback mode connected to each of said channels, said record-playback heads forming a signal upon the magnetic tape in the record mode and obtaining a signal from the magnetic tape in the playback mode; an erase head located in each channel for erasing a signal formed upon the magnetic tape; the improvement comprising a solid state push-pull oscillator circuit, said oscillator circuit including a pair of transistors having base, emitter and collector electrodes; first, second and third windings wound on a magnetic core; said first winding being connected between the collector electrodes of said transistors; a D.C. supply having a first and a second terminal, a center tap on said first winding being connected to the first terminal of said D.C. supply; the emitter electrodes of said transistors being joined together and connected to the second terminal of said D.C. supply; said second winding being connected to said erase heads to apply the alternating signal from said first winding to said erase heads; and said third winding being connected between the base electrodes of said transistors to feed back the signal from said first winding to control the switching of said transistors from an off state to an on state; and an electric light bulb connected in series with said oscillator and said D.C. supply to indicate when said oscillator is producing an output signal.

(References on following page)

References Cited

UNITED STATES PATENTS

| | | | |
|---|---|---|---|
| 2,930,855 | 3/1960 | Blakistone | 179—100.2 |
| 2,956,240 | 10/1960 | Englund | 331—113.1 |
| 2,560,483 | 7/1951 | Schoemehl | 179—100.2 |
| 3,156,863 | 11/1964 | Wakefield | 340—253 |
| 3,354,270 | 11/1967 | Smith et al. | 179—100.2 |

OTHER REFERENCES

Four-Track Tape System, by K. L. Buegel, Electronics World, March 1961, pp. 39–41.

STANLEY M. URYNOWICZ, Jr., *Primary Examiner.*

J. R. GOUDEAU, *Assistant Examiner.*

U.S. Cl. X.R.

331—113, 62, 64